Figure 6:
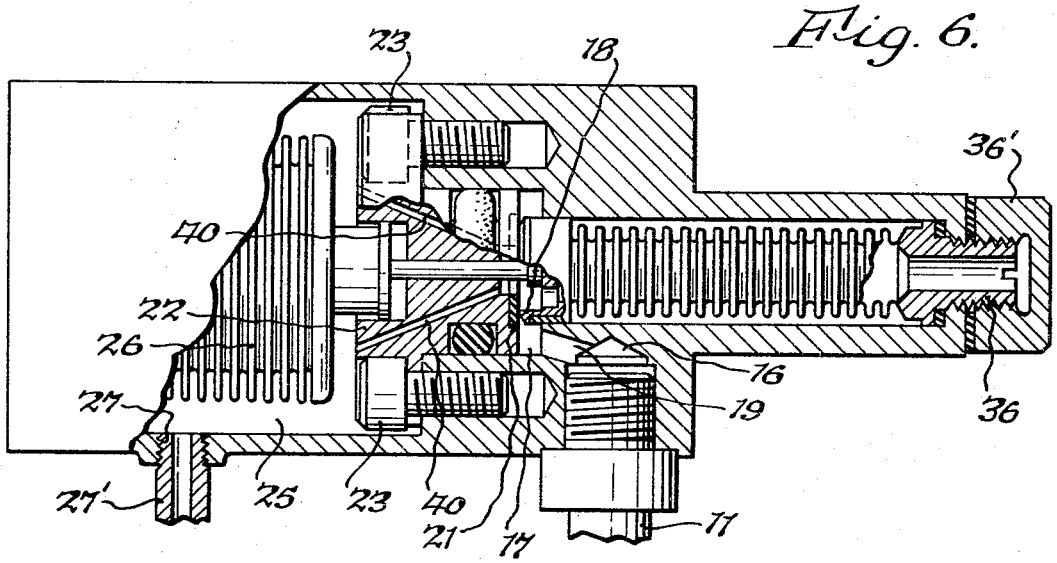

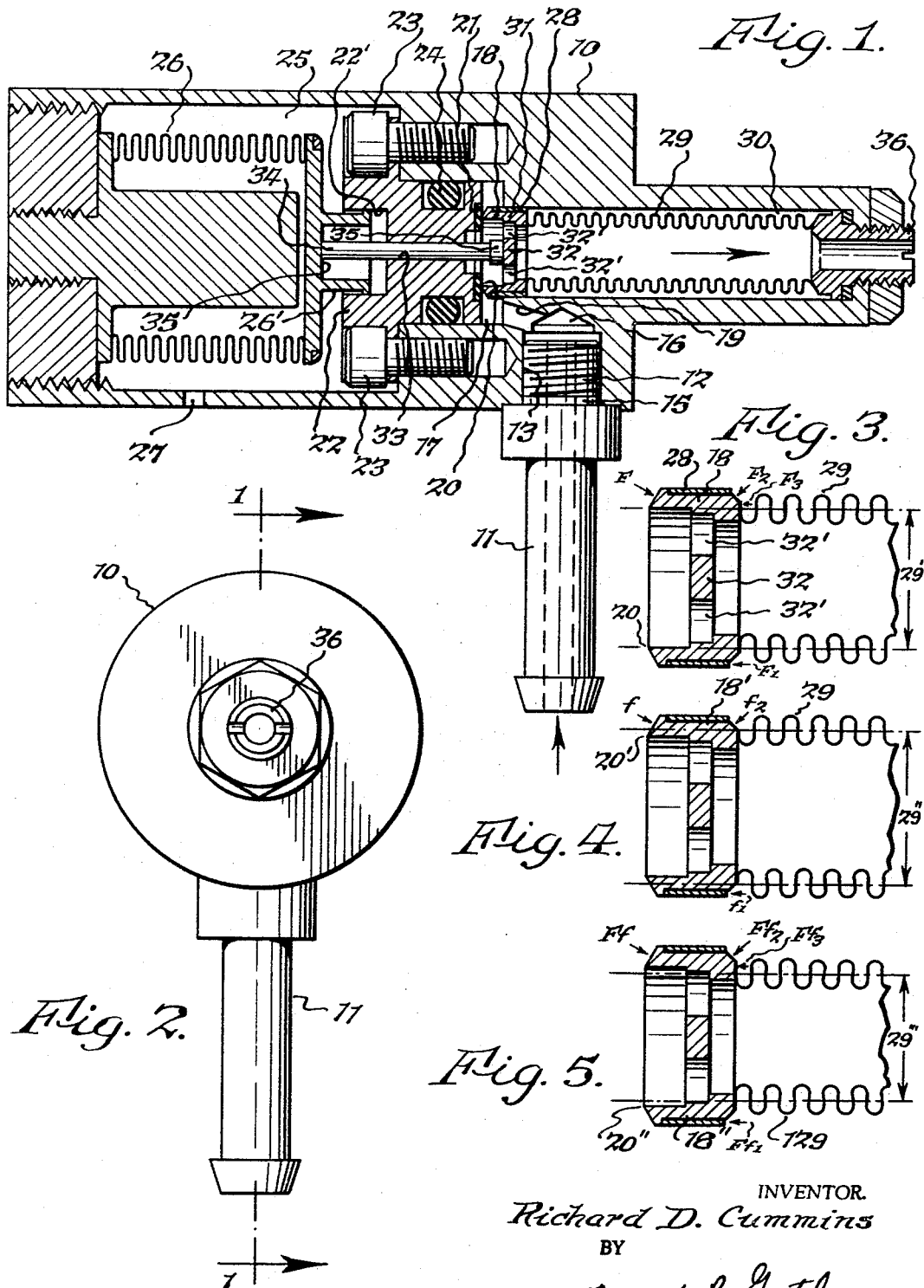

INVENTOR.
Richard D. Cummins
BY
Joseph P. Gastel
ATTORNEY.

United States Patent Office 3,319,649
Patented May 16, 1967

3,319,649
VALVE CONSTRUCTION
Richard D. Cummins, Hamburg, N.Y., assignor to Carleton Controls Corporation, East Aurora, N.Y., a corporation of New York
Filed Dec. 23, 1963, Ser. No. 332,743
1 Claim. (Cl. 137—505.18)

The present invention relates to an improved type of balanced valve construction.

In the past, various types of balanced valve constructions have been known. However these prior balanced valves generally utilized a pair of bellows, one associated with each side of a poppet type of valve. Each of said bellows included a member which provided an area which was substantially equal to the size of the valve to thereby provide an opposed area upon which the fluid pressure which acted on each side of the valve could act to therefore substantially nullify the effect of fluid pressure on the valve. However valves utilizing a plurality of bellows were necessarily unduly cumbersome and expensive in view of the large number of parts. Other prior balanced valves also generally utilized a single bellows with one closed end exposed to inlet or outlet pressure or both. With such valves, pressure balance has not been achieved under all conditions, i.e.: they are not balanced against inlet and outlet pressure when the valves is both open and closed. It is with the providing of an improved balanced valve construction which overcomes the foregoing shortcomings that the present invention is concerned.

It is accordingly the primary object of the present invention to provide an improved balanced valve construction which utilizes only a single bellows in conjunction with a valve with which it is uniquely integrated, to thereby permit a balanced valve assembly to be made with relatively few parts and at relatively low cost. A related object of the present invention is to provide a valve construction which can be fabricated to inherently provide a predetermined unbalance by merely proportioning certain of the parts in a predetermined manner.

Another object of the present invention is to provide a balanced valve construction which requires very little force to open and close the valve and which is unaffected by the fluid pressure to which the valve is subjected, thereby permitting the valve to be closed with relatively little force and thereby in turn prolonging valve life by minimizing the wear on both the valve and valve seat. A related object of the present invention is to provide an improved valve construction which is statically pressure balanced wthen the valve is closed, open, or during the transition between open and closed positions and which is also balanced during all conditions of operation independently of the factor to which the valve is subjected including dynamic pressures and differential pressures across the valves. A further related object of the present invention is to provide an improved valve construction in which flow may be reversed through the valve without upsetting the valve balance and without causing the valve to flutter. Other objects and attendant advantages of the present invention will readily be perceived hereafter.

Figure 7:
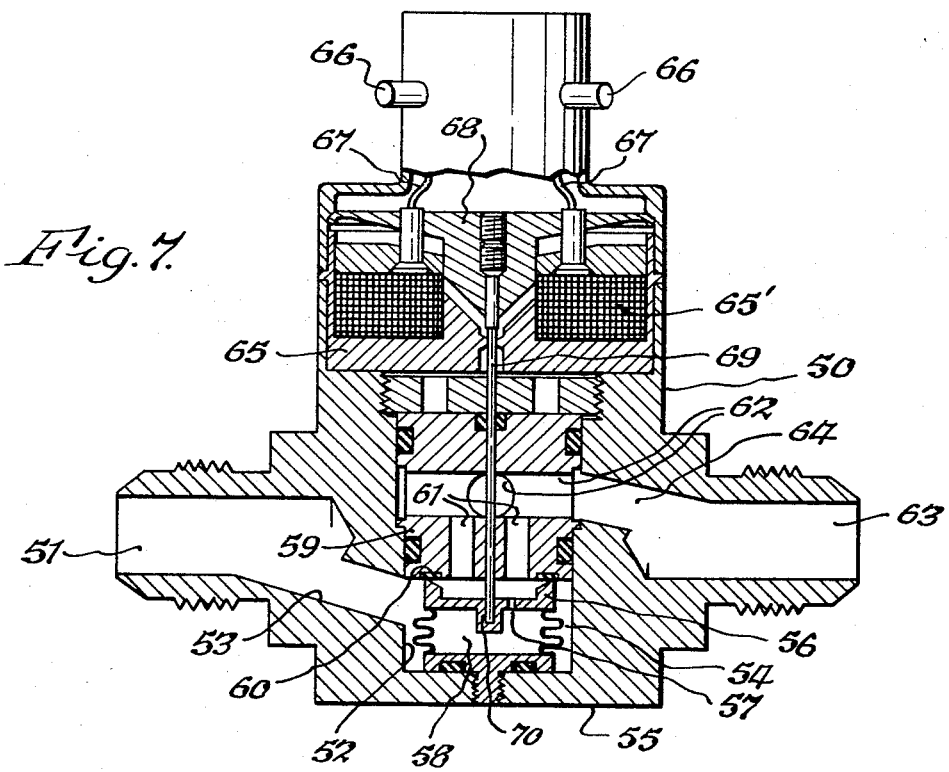

The improved balanced valve construction of the present invention includes a housing having conduits for conducting fluid under pressure to and from the housing. Included in the housing is a chamber in which a bellows has one end thereof mounted on the fluid outlet and the other end thereof in sealed engagement with a hollow annular valve, a portion of which is formed into a lip for seating engagement with a valve seat. The fluid flow, when the valve is unseated, is through the fluid inlet, the hollow annular valve, the inside of the bellows and the fluid outlet. However, an alternate path may be used for fluid flow, namely, through the fluid inlet, the hollow annular valve, and a conduit extending through the valve seat. Preferably the lip of the valve is circular and the bellows is cylindrical. The external portions of the valve head and the bellows are in communication with the source of fluid pressure, and, in accordance with the present invention, the lip has a diameter which is equal to the mean effective diameter of the bellows. Thus the resultant forces due to fluid pressure on the external surface of the valve head total zero and therefore nullify each other to thereby prevent a net resultant force from biasing the valve head either toward a closed or open position, regardless of the pressures to which the valve head is subjected. Furthermore the fluid pressure forces on the external convolutions of the bellows are equal and opposite and therefore tend to nullify each other to provide no net resultant force in either direction. The foregoing conditions always exist regardless of the position of the valve head relative to the valve seat, that is, regardless of whether the valve is open or closed or in transit between open and closed positions. Because of the balancing of the valve in the foregoing manner, the force required to open and close the valve is very slight and the instant valve is manifestly suited for use under conditions where the opening and closing forces which can be provided are relatively small. It will further be appreciated that the diameter of the lip of the valve head and the mean effective diameter of the bellows may be proportioned to be other than equal so that a net resultant force may be provided to tend to bias the valve either to an open or a closed position to meet the requirements of specialized applications, in a manner which will become more apparent hereafter. The present invention will be more fully understood when the following portions of the specification are read in conjunction with the accompanying drawings wherein:

FIG. 1 is a cross sectional view of the improved valve of the present invention taken substantially along line 1—1 of FIG. 2; FIG. 2 is an end elevational view of the improved valve of the present invention; FIG. 3 is a diagrammatic view showing the relationship between the annular valve head and the mean effective diameter of the bellows for providing perfectly balanced valve operation; FIG. 4 is a diagrammatic view of a modified form of the present invention wherein the mean effective diameter of the bellows is greater than the diameter of the valve head to create an unbalance tending to bias the valve head toward an open position; FIG. 5 is a diagrammatic view of a modified form of the present invention showing the mean effective diameter of the bellows being less than the diameter of the valve head to create an unbalance tending to bias the valve head to a closed position; FIG. 6 is a cross sectional view of a modified embodiment of the present invention; and FIG. 7 is a cross sectional view of another modified embodiment of the present invention.

The improved balanced valve of the present invention, as shown in FIG. 1, includes a body or housing 10 having a fluid inlet nipple 11 including a threaded portion 12 which is received in a suitable mating tapped aperture 13 within housing 10, a washer or gasket 15 providing a tight seal between said nipple and said housing. A chamber 16 is formed within housing 10, and chamber 16 is in communication with annular chamber 17 surrounding annular valve head 18 through internal conduit 19. Valve head 18 includes a lip portion 20 (FIG. 3) which is adapted to seat firmly on annular valve seat 21 on valve seat body 22 which is, in turn, secured to housing 10 by screws 23. An O-ring 24 prevents communication between chamber 17 and chamber 25 in which aneroid 26 is mounted by means of suitable connections which are self-apparent from FIG. 1, and therefore not described. Chamber 25 is vented to the atmosphere, or to any other suitable source through vent 27. Annular valve seat 21 may be made of any suitable elastomeric, plastic, or metal material.

The lip portion 20 of valve head 18 is preferably of circular configuration. The valve head 18 has a slipping bellows guide 28 mounted thereon which is preferably cylindrical and clamps the left end of the cylindrical bellows 29 between the internal surface of guide 28 and the external surface of valve head 18 by means of a force fit. Slipping bellows guide 28 is of smaller external dimension than the internal dimension of bore or chamber 30 in which it is mounted to thereby permit the inlet pressure in chamber 17 to communicate with the portion of chamber 30 which is external of bellows 29. The bellows 29, which may be made of metal, plastic, or rubber, is disclosed as being of generally sinusoidal configuration and its mean effective diameter 29' is substantially equal to the diameter of lip 20 of valve head 18, as shown in FIG. 3, for the purpose of providing a perfectly balanced construction, for reasons which will be presented in greater detail hereafter.

Valve head 18, in addition to including lip portion 20, includes a cylindrical central body portion 31 and a spider 32 which essentially consists of a plurality of apertures 32', preferably four, drilled in the web 32, said apertures permitting fluid to pass into bellows 29 from chamber 17 whenever valve head 18 is moved away from seat 21.

Valve seat body 22 includes a central bore 33 in which stem 34 is slidably mounted. The headed end 35 of stem 34 abuts the central portion of spider 32 and the left end of stem 34 is in abutting engagement with surface 35 of aneroid 26 so that as aneroid 26 expands and the end 26' of the aneroid slides in bore 22' of valve seat body 22, stem 34 will be moved to the right to therefore move valve head 18 away from seat 21. When this occurs, communication will be permitted between chamber 17 surrounding valve head 18 and the inside of bellows 29 through apertures 32' in spider 32 to thereby permit the pressurized fluid at inlet nipple 11 to pass through bellows 29 and out of outlet nipple 36, which mounts the end of bellows 29 which is remote from valve head 18.

In all positions of valve head 18, whether it is closed, fully open, or in transit between open and closed positions, the fluid inlet pressure has no effect on the amount of force which is required to move valve head 18, and therefore the amount of force which is required to move valve head 18 toward or away from seat 21 is unaffected by the fluid pressure to which the valve is subjected. Whenever aneroid 26 moves to the left, stem 34 will be caused to move to the left under the bias of the inherent resiliency of bellows 29 until such time as lip 20 of valve head 18 comes to rest in firm seated engagement with valve seat 21. In other words, the only force which has to be overcome in the movement of valve head 18 to the right is the very small force provided by the inherent resiliency of bellows 29. Stated another way, because the force produced by pressurized fluid in chamber 17 does not tend to bias valve head 18 to an open position, because of the above-described dimensional relationship between bellows 29 and lip 20, the force which is required to firmly seat valve head 18 is very small.

As noted above, it is the making of the single cylindrical bellows 29 with a mean effective diameter 29' (FIGURE 3) which is substantially equal to the diameter of lip 20 that permits the foregoing results to be achieved. As can be seen from FIG. 3, the reason that the fluid pressure on valve head 18 does not tend to bias valve head 18 to an open position is because the resultant forces F, F1, F2, and F3 acting on valve head 18 is zero because the effective area on which force F acts is equal to the sum of the effective areas on which forces F1, F2, and F3 act. Furthermore, the resultant of forces produced by fluid pressure on the external convolutions of bellows 29 is also zero because the fluid pressure acts on equal opposed surfaces of said convolutions. Thus, when the forces on valve head 18 are considered in combination with the forces on bellows 29, there is no net force tending to bias the valve head in either direction, regardless of the pressure in chambers 17 and 30.

Preferably both lip 20 and bellows 29 are of cylindrical configuration because when this is the case, the external fluid inlet pressure within chamber 30 which bears on the outside of bellows 29 tends to cause said bellows to maintain its cylindrical configuration to thereby keep the bellows straight and cause the valve head carried thereby to move substantially in an axial direction without binding on the sides of chamber 30. Furthermore, the making of bellows 29 cylindrical causes lip 20 to seat firmly on seat 21 because the external pressure on bellows 29 causes it to remain straight. It will of course be appreciated that both bellows 29 and valve head 10 may be of any other suitable configuration other than cylindrical, if so desired, without departing from the scope of the present invention, provided that the mean effective peripheral dimension of bellows 29 is substantially equal to the peripheral dimension of lip 20 of valve head 18. Furthermore, while bellows 29 has been depicted and described as being of sinusoidal configuration, it will be appreciated that its wall may be of square wave form or of any other form which is desired so long as its mean effective diameter is substantially equal to the mean effective diameter of lip 20 of valve head 18. If desired, in other applications, in lieu of an aneroid such as 26 for moving lip 20 of valve head 18 from seat 21, any other suitable motivating elements may be utilized including solenoids, electric motors, mechanical linkages, or the like.

It will be appreciated that the flow through the inlet and outlet of valve body 10 may be reversed so that nipple 36 functions as an inlet and nipple 11 functions as an outlet, and, during such reversal, the valve will operate in the same manner as described above before the inlets and outlets were reversed. When the fluid flow is reversed in the foregoing manner an O ring is required on stem 34 to prevent the high pressure fluid within valve head 18 from leaking between said stem and bore 33. Furthermore when nipple 36 functions as a high pressure inlet, slight unbalance would occur because of the stem area. However, because of very small actuating forces required, the stem diameter may be relatively small and the unbalance would therefore be small.

In addition it is to be especially noted that in the event that flow is reversed through bellows 29 during the time that the valve head 18 is off of its seat 21, the valve head 18 will remain in its normal open condition, as dictated by the position of stem 34, and that the reversal of fluid flow will in no way tend to cause valve head 18 to depart from the position it occupied before flow was reversed. In view of the fact that fluid pressure does not affect valve head 18 during flow reversal conditions or during conditions during which the valve head 18 is moved toward or away from seat 21, the valve is stable under all conditions of operation and flutter of the valve is virtually eliminated. In other words the improved valve structure of the present invention is balanced during all conditions of operation independently of the static inlet and outlet pressures, the dynamic pressures to which the valve is subjected, and the differential pressures across the lip 20 of valve head 18.

By the use of the improved valve construction of the present invention it can readily be seen that a high spring force is not necessary to maintain lip 21 seated on valve seat 20. Thus pressure of the lip 20 of valve head 18 on valve seat 21 is virtually eliminated with the attendant elimination of wear of both the seat and the valve. Furthermore the force required to oppose the spring force of bellows 29 tending to bias the valve head 18 to a closed position is very slight because the spring force of bellows 29 is virtually nonexistent, and thus valve head 18 may be moved toward and away from its associated seat 21 with very little force, thus tending to make the improved valve construction of the present invention extremely practical in applications where only small motivating forces are available.

While the equal relationship between the diameter of lip 20 of valve head 18 and the mean effective diameter 29' of bellows 29, as described above, has been shown in FIG. 3, it will be appreciated that the present valve construction may be modified to provide either a biasing force tending to maintain valve head 18 in a closed position or to maintain it in an open position so that the force which motivates valve head 18 has to overcome such forces. In this respect it is to be noted from FIG. 4 that the mean effective diameter 29' of bellows 29 is greater than the diameter of lip 20' of valve head 18'. Thus there will be a net force exerted tending to bias valve head 18' to the right, that is, toward an open position on valve seat 21. This type of construction is utilized where it is necessary that there always be a force tending to bias valve head 18' to an open position. It can readily be seen from FIG. 4 that the resultant of forces $f$, $f1$, and $f2$ provides a net force tending to move valve head 18' to the right because there is a greater effective area on surface $f$ than on surfaces $f1$ and $f2$. Furthermore, the pressure exerted on convolutions of bellows 29 provides forces which tend to equalize each other. Thus when the forces on the valve head are considered in combination with the forces on bellows 29, there is a net biasing force tending to move valve head 18' to the right, that is, toward an open position.

In FIG. 5 a further modified construction of the present invention is disclosed wherein the mean effective diameter 29''' of bellows 129 is smaller than the diameter of lip 20'' of valve head 18''. In this case when valve head 18'' is mounted within valve body 10, as described above with respect to FIG. 1, there will be a net force tending to bias valve head 18'' to the left in FIG. 5 and thus tending to maintain valve head 18'' on the valve seat. This construction is utilized in applications where it is desired to maintain valve head 18'' closed by utilizing the normal inlet forces of the pressurized fluid. In this case, as can readily be visualized, the force required by a suitable motor means for bringing valve head 18'' to an open position must overcome the net force provided by the fluid pressure which tends to maintain the valve in a closed condition. The foregoing can be more readily visualized when it is considered that the resultant of forces $Ff$, $Ff1$, $Ff2$, and $Ff3$ provides a net force tending to move valve head 18'' to the left because forces $Ff1$, $Ff2$, and $Ff3$ act on a great effective area than force $Ff$. Furthermore, the total of the forces produced on the convolutions of bellows 129 is substantially zero because these forces nullify each other because they act on equal opposed surfaces of the bellows. In other words there is more effective area on valve head 18'' to receive the fluid pressure forces tending to bias it to the left than the amount of effective area tending to bias valve head 18'' to the right. Thus, in combination, the fluid pressure forces exerted on both bellows 129 and on valve head 18'' provide a net force tending to bias valve head 18'' to the left.

It is to be noted that the lip 20 of all the embodiments of the present invention is preferably as sharp as practical so that the exact diameter of this lip may approach the mean effective diameter of the bellows to produce the above-described primary result which causes the valve to be balanced by the use of a single bellows irrespective of the fluid pressures to which the valve is subjected.

In addition to the fluid flow path described above, the improved valve of the present invention may be modified to provide another flow path, as can be seen from FIG. 6. More specifically, conduits 40 may be drilled through valve seat body 22, said conduits extending from a position within the periphery of valve seat 21 to a point adjacent the heads of screw 23. Furthermore, nipple 36 may be closed off, by the use of a cap such as 36' so that flow will be through nipple 11, chamber 16, conduit 19, chamber 17, the above-mentioned conduits 40 in valve seat body 22, chamber 25 and a nipple 27 in vent 27. In the foregoing construction the aneroid 26 is subjected to exhaust pressure of the fluid and this will cause the valve to act as a pressure regulator because aneroid 26 will move valve head 18 in response to the exhaust pressure to which it is subjected. In other words, the embodiment of FIG. 6 differs from the embodiment of FIG. 1 only by conduits 40, cap 36', and nipple 27'.

In FIG. 7 another embodiment of the present invention is shown. This embodiment has a flow path which differs from the embodiments of FIGS. 1 and 6 in that flow is not through the bellows, as in FIG. 1, and is also not through a chamber in which an aneroid is located, as in FIG. 6. In the embodiment of FIG. 7 a housing 50 is shown having an inlet nipple 51 which is in communication with a bellows chamber 52 through conduit 53. Bellows 54 is mounted in bellows chamber 52 and has one end thereof secured to wall 55 and the other end mounting annular valve head 56. A vent 57 is located in valve head 56 to permit fluid to enter the internal portion 58 of bellows 54 for equalizing purposes. A valve seat body 59 is located within housing 50 and mounts an annular valve seat 60. Valve seat body 59 has a plurality of conduits 61 drilled therein to effect communication between chamber 52 and chamber 62 when valve head 56 has moved away from valve seat 60. Chamber 62 is in turn in communication with outlet nipple 63 through conduit 64.

Valve housing 50 includes a solenoid 65 suitably mounted therein, said solenoid having a coil 65' which is connected to connectors 66 by leads 67. The solenoid includes a core 68 which moves downwardly in FIG. 7 whenever solenoid coil 65' is energized and therefore carries shaft 69 attached thereto downwardly also, the end of shaft 69 which is remote from core 68 being affixed to valve head 56 at 70.

The various O rings and sealing elements which are clearly shown in this figure have not been identified with numerals, in the interest of brevity. It is to be especially noted that the construction is such that whenever solenoid 65 is deenergized, the inherent resiliency of bellows 54 will cause valve 56 to return to its seat. The valve construction of FIG. 7 is intended to be utilized in situations where very small electrical activating forces are present. It is also to be noted as a matter of interest that the mean effective diameter of bellows 54 of FIG. 7 is the same as the diameter at the lip of valve 56 to give a balanced operation. Therefore the same type of operation will be obtained from the valve of FIG. 7 as was described above with respect to the valve of FIG. 3. It will be appreciated however that for any desired purpose the relative diameters of valve 56 and bellows 54 may be varied to give a desired biasing force of the valve relative to its seat, as described in detail above relative to FIGURES 4 and 5.

In keeping with one of the objects of this invention to provide a balanced valve construction which requires a very small force to open and close the valve, it will be especially noted that all embodiments of the instant valve construction are manifestly suitable for use with miniature solenoid valves, such as shown in FIG. 7, which have their weight and power reduced very much over solenoid valves which are in conventional use. In addition the instant valve structure is manifestly suitable for use with miniature regulators which have relatively small and extremely sensitive diaphragms or bellows. In other words, any actuating devices capable of producing only small forces, whether such devices operate electrically, mechanically, or by fluid pressure, can be used to operate the valve structure of the present invention because only small forces are required for actuating the valve because of its unique construction.

It can thus be seen that the improved balanced valve construction of the present invention is manifestly capable of achieving the above enumerated objects, and while preferred embodiments of the present invention have been disclosed, it will be readily appreciated that the present invention is not necessarily limited thereto, but may be otherwise embodied within the scope of the following claim.

What is claimed is:

A valve construction comprising a housing, first conduit means in communication with said housing for conducting fluid relative to said housing, a valve seat body mounted in said housing, an annular valve seat on said valve seat body, an annular valve head in said housing having a lip for engagement with said annular valve seat and having an external portion and an internal portion, a hollow bellows means, said hollow bellows means having an inner surface defining an internal portion and an outer surface defining an external portion, said hollow bellows means having a first end in sealed engagement with said annular valve head and a second end mounted relative to said housing, first chamber means in said housing in communication with said first conduit means and surrounding said external portion of said valve head and said external portion of said bellows means, second chamber means in said housing, an aneroid having first and second portions in said second chamber means with said first portion being connected to said housing, second conduit means in communication with said second chamber means for conducting fluid, stem means located proximate said second portion of said aneroid and effectively extending between said aneroid means and said valve head for moving said valve head into and out of seated engagement with said valve seat to thereby effect communication between said first and second conduit means when said valve head is unseated and to prevent such communication when said valve head is seated, means mounted relative to said housing for maintaining movement of said second portion of said aneroid means within a predetermined valve head actuating path, third conduit means extending through said valve seat body for effecting communication between said second chamber means and said internal portion of said bellows and said internal portion of said valve head when said valve head is in seated engagement with said valve seat, said lip having a first effective diameter and said bellows means having a second mean effective diameter, said first diameter and said second diameter being substantially equal to each other to thereby cause the action of the fluid in said first and second conduit means to provide a substantially constant force tending to bias said valve head relative to said valve seat in all positions of said valve head whether opened, closed or in transit between opened and closed positions.

References Cited by the Examiner

UNITED STATES PATENTS

| 2,538,436 | 1/1951 | Weinberg | 137—508 X |
| 2,631,412 | 3/1953 | Work | 137—505 |
| 2,730,269 | 1/1956 | Earle | 137—505 X |
| 2,938,540 | 5/1960 | Schatzman | 137—588 |
| 3,139,900 | 7/1964 | Karing | 137—505 |

FOREIGN PATENTS

| 485,102 | 10/1953 | Italy. |
| 294,955 | 2/1954 | Switzerland. |
| 1,193,775 | 4/1959 | France. |
| 846,106 | 8/1960 | Great Britain. |

WILLIAM F. O'DEA, *Primary Examiner.*

ISADOR WEIL, H. W. WEAKLEY, *Assistant Examiners.*